United States Patent [19]
Laurent et al.

[11] 3,743,741
[45] July 3, 1973

[54] PHARMACEUTICAL COMPOSITION BASED ON 11-HALOGEN SUBSTITUTED STEROIDS

[75] Inventors: Henry Laurent; Ulrich Kerb; Karl-Heinz Kolb; Rudolf Wiechert; Erich Gerhards, all of Berlin, Germany

[73] Assignee: Schering Aktiengesellschaft, Berlin, Germany

[22] Filed: Aug. 20, 1971

[21] Appl. No.: 173,638

Related U.S. Application Data

[62] Division of Ser. No. 753,034, Aug. 15, 1968, Pat. No. 3,609,171.

[30] Foreign Application Priority Data
Aug. 16, 1967 Germany.................. P 16 43 036.7

[52] U.S. Cl. .............................................. 424/242
[51] Int. Cl........................................... A61k 17/00
[58] Field of Search................ 424/242; 260/397.45

[56] References Cited
UNITED STATES PATENTS

| | | | |
|---|---|---|---|
| 3,609,171 | 9/1971 | Laurent et al. | 260/397.45 |
| 3,501,513 | 3/1970 | Basco | 260/397.45 |
| 3,426,128 | 2/1969 | Kieslich et al. | 424/243 |
| 3,422,193 | 1/1969 | Shapiro et al. | 424/243 |
| 3,415,855 | 1/1968 | Shapiro et al. | 260/397.45 |

*Primary Examiner*—Shep K. Rose
*Attorney*—Michael S. Striker

[57] ABSTRACT

Pharmaceutical composition containing as active ingredient an 11-halogen substituted steroid of the formula

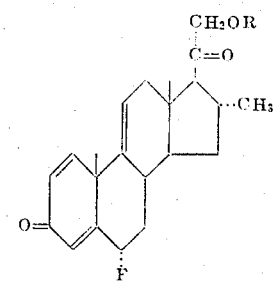

wherein R is hydrogen, aliphatic acyl of up to 15 carbon atoms or aliphatic acyl having up to a total of 15 carbon atoms and being substituted with chlorine, or a carboxylic acid group, a nitryl group or a sulphate group and wherein X and Y are halogen, the molecular weight of Y being at least equal to that of X.

The compositions of the invention are useful particularly as anti-inflammatory agents.

The invention also embraces a method of treating patients suffering from inflammatory conditions with the defined compositions.

31 Claims, No Drawings

PHARMACEUTICAL COMPOSITION BASED ON 11-HALOGEN SUBSTITUTED STEROIDS

CROSS-REFERENCES TO RELATED APPLICATIONS

This application is a division of application Ser. No. 753,034, filed Aug. 15, 1968 now U.S. Pat. No. 3,609,171.

BACKGROUND OF THE INVENTION

Steroids are known which have an anti-inflammatory reducing effect. For instance, 6α-fluoro-11β,21-hydrogen-16α-methyl-1,4-pregnadiene-3,20-dione has been used for this purpose. However, it appeared desirable to improve the prior art compounds as to the onset of their action and also as to the time interval existing between onset and maximum effect.

There was furthermore a desire to increase the effectiveness of the drugs and to eliminate or further reduce undesirable side effects.

SUMMARY OF THE INVENTION

It is, therefore, a specific object of the present invention to provide an anti-inflammatory composition which rapidly becomes effective after its administration.

The above and other objects as will appear from the specification that follows are accomplished by a pharmaceutical composition containing as active ingredient an 11-halogen substituted steroid of the formula

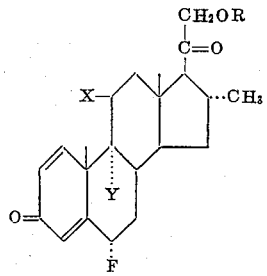

wherein R is hydrogen, aliphatic acyl of up to 15 carbon atoms or aliphatic acyl having up to a total of 15 carbon atoms and being substituted with chlorine, or a carboxylic acid group, a nitryl group or a sulphate group and wherein X and Y are halogen, the molecular weight of Y being at least equal to that of X.

The invention also embraces a method of treating patients suffering from inflammatory conditions with the defined compositions.

DESCRIPTION OF THE PREFERRED EMBODIMENTS

With reference to the general formula set forth in the above summary, it will be understood that R may comprise physiologically acceptable acid residues as they are used in conventional process in steroid chemistry for esterification of free hydroxyl groups. Preferred are esters having up to 15 carbon atoms, particularly of the lower and intermediate aliphatic carboxylic acids. The acids can also be unsaturated, branched, polycarboxylic or conventionally substituted, for instance by hydroxy or amino groups or halogen atoms themselves. Suitable cycloaliphatic, aromatic, mixed aromatic-aliphatic or heterocyclic acids, all of which may also be substituted in a suitable manner. Examples of such acids are the following: formic acid, acetic acid, propionic acid, butyric acid, valeric acid, caproic acid, enanthic acid, undecylic acid, trimethylacetic acid, diethylacetic acid, tert. butylacetic acid, phenylacetic acid, cyclopentylpropionic acid, oleic acid, lactic acid, mono-, di- and trichloroacetic acid, aminoacetic acid, succinic acid, adipic acid, benzoic acid and nicotinic acid. There can also be used conventional inorganic acids, such as sulfuric, nitric or phosphoric acid.

A preferred process for preparing the compounds of the invention consists in the halogenation of the 9,11-positions of the corresponding steroids. The starting products of the invention thus may be the following:

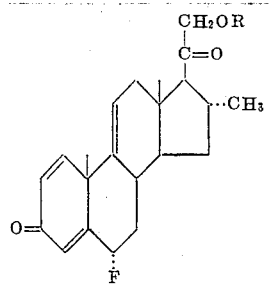

wherein R is hydrogen or acyl.

These starting products can be obtained by dehydrating the corresponding 11-hydroxy compounds. The dehydration can be effected, for instance, by reacting the 11-hydroxy-21-acyloxy-steroids with methanesulfochloride in pyridine and dimethylformamide.

For instance, 6α-fluoro-21-hydroxy-16α-methyl--1,4,9(11)-pregnatriene-3,20-dione can be obtained in a smooth reaction by saponifying the corresponding 21-ester.

The addition of the halogen to the $\Delta^{9(11)}$-double bond can be effected in a number of ways. For instance, halogens such as chlorine or bromine or intercompounds of different halogens such as chlormonofluoride or brommonochloride or halogens derived from polyhalides such as potassium triiodide or iodobenzyldichloride, may be substituted directly at the double bond by an addition reaction. The halogen substitution will proceed with greatest ease if the $\Delta^{9(11)}$-steroids are simultaneously reacted with a positive and a negative halogen. Reagents containing a positive halogen are, for instance, halogenosuccinimide, halogenoacetamide or the halogens proper. Reagents for supplying the negative halogen are, for instance, the hydrogen halides and alkali metal halides. The substitution of the halogen at the $\Delta^{9(11)}$-double bond of the steroid always proceeds in a manner where the positively charged halogen attaches to the 9-position and the negatively charged halogen attaches to the 11-position of the molecule. The molecule weight of the halogen in the 9-position therefore can never be smaller than that of the halogen in the 11-position. The halogen addition to the $\Delta^{9(11)}$-double bond is preferably carried out at temperatures between −75°C and +50°C.

The free hydroxyl group or ester group in the 21-position can subsequently be esterified or saponified in conventional manner. It is advisable, however, to use mild conditions in order to obtain a good yield.

The new compounds have an excellent antiinflammatory action, as determined in vasoconstriction tests carried out with male test subjects after local application. This is further illustrated by the data listed in Table 1 below, where compounds II to IX are compared with the prior art Compound I, 6α-fluoro-11β,21-dihydroxy-16α-methyl-1,4-pregnadiene-3,20-dione.

The vasoconstriction test to determine the clinical experimental superiority of the compounds of the invention was carried out as follows:

The stratum corneum on the backs of male test subjects of the ages 18 to 38 was abraded with a Tesa film of 2 cm width by means of 20 scratches applied above each other so as to cause a marked hyperemia. 4 cm² large areas were then set apart in the exposed skin portion and 50 mg of a water/oil ointment base were applied to those areas upon simultaneous application of pressure. The base in each instance contained 0.01 percent, 0.001 percent and 0.0001 percent, respectively, of the test compound. The back of the subject was then photographed with a Kodak color film at predetermined intervals. The color of the individual skin areas appearing on the Kodak color film was then converted into light intensity values for determining the hyperemia and vasoconstriction. The portions projected by the color film through an apertured disk onto an interference filter could then be distinguished by their light intensity. A secondary electron multiplier of the FS 9 A type was used as light intensity indicator and the color value was measured by the anode current of the secondary multiplier. The color value of the untreated and the treated abraded skin was determined and compared with the color value of normal skin, since vasoconstriction can be considered as the representative symptom of an anti-inflammatory action and can be used to appraise the inception, intensity and duration of the action. The color value of the normal skin in these tests was set at 100 and the color value of untreated abraded skin was set at 0. There could thus be evaluated low, intermediate and high vasoconstriction by ascertaining the values between 0 and 100.

TABLE 1

| Test No. | Compound | Dose (%) | Time after which observation took place (in hrs.) | | | | | | |
|---|---|---|---|---|---|---|---|---|---|
| | | | 1 | 2 | 3 | 4 | 5 | 6 | 7 |
| I | 6α-fluoro-11β,21-dihydroxy-16α-methyl-1,4-pregnadiene-3,20-dione | 0.01 0.001 0.0001 | 0 0 0 | 25 20 15 | 40 44 25 | 50 75 | 100 100 50 | 90 | 100 |
| II | 6α-fluoro-9,11β-dichloro-21-acetoxy-16α-methyl-1,4-pregnadiene-3,20-dione | 0.01 0.0001 | 5 0 | 30 15 | 75 30 | 95 60 | 100 85 | 100 | |
| III | 6α,11β-difluoro-9-chloro-21-acetoxy-16α-methyl-1,4-pregnadiene-3,20-dione | 0.01 0.001 0.0001 | 15 15 0 | 35 40 30 | 80 75 60 | 100 100 90 | 100 | | |
| IV | 6α,11β-difluoro-9-chloro-21-trimethyl-acetoxy-16α-methyl-1,4-pregnadiene-3,20-dione | 0.01 0.001 0.0001 | 25 10 10 | 55 50 40 | 100 75 60 | 100 85 | 100 | | |
| V | 6α,11β-difluoro-9-chloro-21-butyryloxy-16α-methyl-1,4-pregnadiene-3,20-dione | 0.01 0.001 0.0001 | 15 15 0 | 45 50 30 | 95 75 55 | 100 100 90 | 100 | | |
| VI | 6α-fluoro-9,11β-dichloro-21-trimethyl-acetoxy-16α-methyl-1,4-pregnadiene-3,20-dione | 0.01 0.0001 | 10 10 | 55 40 | 85 75 | 100 90 | 100 | | |
| VII | 6α-fluoro-9,11β-dichloro-21-butyryloxy-16α-methyl-1,4-pregnadiene-3,20-dione | 0.01 0.001 0.0001 | 15 20 0 | 55 50 35 | 90 80 60 | 100 100 90 | 100 | | |
| VIII | 6α-fluoro-9,11β-dichloro-21-valeryloxy-16α-methyl-1,4-pregnadiene-3,20-dione | 0.01 0.001 0.0001 | 10 0 | 40 25 | 80 50 | 95 80 | 100 100 | | |
| IX | 6α,11β-difluoro-9-chloro-21-valeryloxy-16α-methyl-1,4-pregnadiene-3,20-dione | 0.01 0.001 0.0001 | 15 10 0 | 55 40 25 | 90 90 40 | 100 100 90 | 100 | | |

The above tests of Table 1 clearly demonstrate that apart from an earlier inception of the action, the desired maximum degree of activity is reached faster with the compounds of the invention than with the comparison compound. The intensity of action of the new compounds is also greater throughout the time tested than with the known product. In addition, there is a more desirable absence of side effects with the compounds of the invention. For instance, the carbohydrate metabolism is effected either not at all or only to a minor extent. The gluconeogenetic action is also substantially reduced as appears, for instance, from the fact that the blood sugar concentration is not increased and that the liver glycogen starts increasing only at an extremely high dose. There is also only a minor effect on the liver enzyme, tryptophane pyroolase and the transminases GOT and GPT. Significantly minor changes in sodium, potassium and phosphate elimination also are observed under the action of the compounds of the invention.

The compounds of the invention are valuable in combination with the conventional carriers used in Galenical pharmacy for use in the treatment of a number of diseases, such as:

[a] by local administration: contact dermatitis, varied eczemas, neurodermatitis, erythrodermia, first degree burns, pruritus vulvae et ani, rosacea erythematodes cutaneus, psoriasis, lichen rubber planus and verrucosus;

[b] by oral administration: acute and chronic polyarthritis, neurodermatitis, bronchial asthma, hay fever, etc.

The following examples will further illustrate the invention without in any way limiting the scope thereof.

EXAMPLE 1

18 ml anhydrous fluoric acid were reacted with 25 ml tetrahydrofuran and 35 ml methylenechloride at −75°C. 8.70 g 6α-fluoro-21-acetoxy-16α-methyl-1,4,9(11)-pregnatriene-3,20-dione (melting point 160°–162°C) and 4.6 g N-bromosuccinimide were dissolved in this mixture. The solution was stirred for 3.5 hours at −50°C and then poured into a solution of 120 g sodium bicarbonate in 3.5 liters water. The resulting solution was then extracted with methylene chloride and the organic phase was washed with water and dried and the solvent evaporated in vacuum. There were obtained from acetone hexane, 6.39 g 6α,11β-difluoro-9-bromo-21-acetoxy-16α-methyl-1,4-pregnadiene-3,20- dione with a melting point between 210.5° and 211°C; UV: $\epsilon_{238} = 15,200$.

EXAMPLE 2

42 ml anhydrous fluoric acid, 57 ml tetrahydrofuran and 80 ml methylenechloride were added together at −75°C. 20 g 6α-fluoro-21-acetoxy-16α-methyl-1,4,9(11)-pregnatriene-3,20-dione and 10 N-chlorosuccinimide were dissolved in this mixture, and after stirring the solution for 5 hours at −60°C, additional 20 g N-chlorosuccinimide were added and the reaction mixture was permitted to stand for 16 hours at 0°C. The mixture was then poured into a solution of 270 g sodium bicarbonate in 3 liters water and was extracted with methylenechloride. The organic phase was washed with a sodiumhydrogensulfide-sodiumbicarbonate solution and water. After drying, the solvent was evaporated in vacuum. There were obtained from acetone/hexane 12.4 g 6α,11β-difluoro-9-chloro-21-acetoxy-16α-methyl-1,4-pregnadiene-3,20-dione with a melting point of 249.5°–250°C. UV: $\epsilon_{236} = 15,900$.

EXAMPLE 3

A solution of 1.0 g 6α,11β-difluoro-9-bromo-21-acetoxy-16α-methyl-1,4-pregnadiene-3,20-dione in 3.0 ml methylenechloride was reacted at −10°C with 6.2 ml of a 0.2 N sodiummethylate solution in methanol. The reaction was subjected to stirring for 45 minutes in a nitrogen atmosphere at −10°C, neutralized with acetic acid and extracted with methylenechloride. The organic phase was washed with sodium bicarbonate and water, dried and concentrated in vacuum. The residue was recrystallized from acetone/hexane. There were obtained 774 mg 6α,11β-difluoro-9-bromo-21-hydroxy-16α-methyl-1,4-pregnadiene-3,20-dione with a melting point between 206° and 206.5°C. UV: $\epsilon_{239} = 14,900$.

EXAMPLE 4

1.0 g 6α,11β-difluoro-9-chloro-21-acetoxy-16α-methyl-1,4-pregnadiene-3,20-dione was saponified with sodium methylate, following the conditions given in Example 3. There were obtained 770 mg 6α,11β-difluoro-9-chloro-21-hydroxy-16α-methyl-1,4-pregnadiene-3,20-dione, melting point 211.5° to 214°C (acetone/hexane). UV: $\epsilon_{236} = 16,500$.

EXAMPLE 5

A solution of 2.75 g 6α,11β-difluoro-9-bromo-21-hydroxy-16α-methyl-1,4-pregnadiene-3,20-dione in 11 ml pyridine and 5.5 ml butyric acid anhydride was permitted to stand for 16 hours at room temperature. The precipitated crystalline substance was isolated after addition of water and was twice recrystallized from acetone. There were obtained 2.45 g 6α,11β-difluoro-9-bromo-21-butyryloxy-16α-methyl-1,4-pregnadiene-3,20-dione with a melting point between 164.5° and 165.5°C. UV: $\epsilon_{238} = 15,000$.

EXAMPLE 6

3.95 g 6α,11β-difluoro-9-chloro-21-hydroxy-16α-methyl-1,4-pregnadiene-3,20-dione were reacted in the manner stated in Example 5. There were obtained 3.16 g 6α,11β-difluoro-9-chloro-21-butyryloxy-16α-methyl-1,4-pregnadiene-3,20-dione with a melting point between 183° and 184°C (acetone/hexane). UV: $\epsilon_{236} = 16,600$.

EXAMPLE 7

A solution of 2.75 g 6α,11β-difluoro-9-bromo-21-hydroxy-16α-methyl-1,4-pregnadiene-3,20-dione in 40 ml methylenechloride was reacted with 5.5 ml trimethylacetic acid anhydride and 14 ml of a 20 percent aqueous sodium hydroxide solution. The mixture was heated upon vigorous stirring and under reflux to 40°C in a nitrogen atmosphere. After 2 hours it was washed neutral with water, dried and subjected to evaporation of the solvent in a vacuum. The residue was twice recrystallized from acetone/hexane. There were obtained 2.58 g 6α,11β-difluoro-9-bromo-21-trimethylacetoxy-16α-methyl-1,4-pregnadiene-3,20-dione with a melting point between 190.5° and 191°C. UV: $\epsilon_{239} = 15,000$.

EXAMPLE 8

3.73 g 6α,11β-difluoro-9-chloro-21-hydroxy-16α-methyl-1,4-pregnadiene-3,20-dione were reacted with trimethylacetic acid anhydride in the manner described in Example 7. There were obtained 3.04 g 6α,11β-difluoro-9-chloro-21-trimethylacetoxy-16α-methyl-1,4-pregnadiene-3,20-dione with a melting point between 196° and 198°C (acetone/hexane). UV: $\epsilon_{236} = 16,500$.

EXAMPLE 9

A solution of 10.0 g 6α-fluoro-21-acetoxy-16α-methyl-1,4,9(11)-pregnatriene-3,20-dione in 300 ml acetic acid was reacted with 50.0 lithium chloride and a solution of 2.3 g chlorine in 200 ml acetic acid and was subjected to stirring for 2.5 hours at room temperature. The solution was then poured into water, the precipitated product was removed by suction, washed with water and dried in vacuum. The crude product was subjected to chromatography through silica gel. After recrystallization from acetone/hexane, there were obtained 2.23 g 6α-fluoro-9,11β-dichloro-21-acetoxy-16α-methyl-1,4-pregnadiene-3,20-dione with a melting point between 239° and 240°C. UV: $\epsilon_{236} = 16,200$.

EXAMPLE 10

6 ml anhydrous fluoric acid were reacted at −75°C with 9 ml tetrahydrofuran and 12 ml methylene chloride. 3.0 g 6α-fluoro-21-hydroxy-16α-methyl-1,4,9(11)-pregnatriene-3,20-dione (melting point 172°–173°C) and 1.5 g N-bromosuccinimide were dissolved in this mixture. It was then subjected to stirring for 4 hours at −5°C and poured into a solution of 40 g sodium bicarbonate in 1.2 liters water, followed by drying and evaporation in vacuum. After recrystallization from acetone/hexane, there were obtained 1.57 g 6αα,-11β-difluoro-9-bromo-21-hydroxy-16α-methyl-1,4-pregnadiene-3,20-dione with a melting point between 205° and 206°C. UV: $\epsilon_{239} = 14,800$.

EXAMPLE 11

A solution of 1.68 g 6α-fluoro-21-acetoxy-16α-methyl-1,4,9(11)-pregnatriene in 85 ml acetic acid was reacted with 8.5 g lithium chloride, 1.68 g N-bromoacetamide and 3.4 ml HCl-saturated dioxane. The mixture was subjected to stirring at room temperature for 1 hour, then poured into water, whereupon the precipitated product was removed by suction, washed with water and dried in vacuum. After recrystallization, there were obtained 1.29 g 6α-fluoro-11β-chloro-9- bromo-21-acetoxy-16α-methyl-1,4-pregnadiene-3,20-dione with a melting point of 186.5° to 187.5°C. UV: $\epsilon_{239} = 14,300$.

EXAMPLE 12

6.7 g 6α-fluoro-11β-chloro-9-bromo-21-acetoxy-16α-methyl-1,3-pregnadiene-3,20-dione were saponified with sodium methylate in the manner described in Example 3. The yield was 4.8 g 6α-fluoro-11β-chloro-9-bromo-21-hydroxy-16α-methyl-1,4-pregnadiene-3,20-dione with a melting point between 162° and 163°C. UV: $\epsilon_{238} = 14,400$.

EXAMPLE 13

A solution of 250 mg 6α-fluoro-11β-chloro-9-bromo-21-hydroxy-16α-methyl-1,4-pregnadiene-3,20-dione in 1.25 ml dimethylformamide was reacted with 0.5 ml chloroacetylchloride under cooling with ice. The mixture was stirred at room temperature for 45 minutes and subsequently poured into water. The precipitate was removed by filtration, washed, dried and recrystallized from acetone/hexane. Yield: 180 mg 6α-fluoro-11β-chloro-9-bromo-21-chloroacetoxy-16α-methyl-1,4-pregnadiene-3,20-dione with a melting point between 197.5° and 198°C. UV: $\epsilon_{238} = 14,600$.

EXAMPLE 14

1.0 g 6α-fluoro-9,11β-dichloro-21-acetoxy-16α-methyl-1,4-pregnadiene-3,20-dione were saponified in the manner described in Example 3. There were obtained 780 mg 6α-fluoro-9,11β-dichloro-21-hydroxy-16α-methyl-1,4-pregnadiene-3,20-dione with a melting point between 213° and 218°C (acetone/hexane). UV: $\epsilon_{236} = 17,000$.

EXAMPLE 15

7.0 ml acetic acid anhydride were reacted with 4.5 ml conc. nitric acid (D=1.50) at −10°C. To this mixture was added, under stirring, a solution of 700 mg 6α-fluoro-9,11β-dichloro-21-hydroxy-16α-methyl-1,4-pregnadiene-3,20-dione in 30 ml chloroform. The mixture was subjected to stirring at −10°C for 30 minutes, poured into ice water and extracted with methylenechloride. The organic phase was washed with a sodium-bicarbonate solution and water, dried, and concentrated in vacuum. The residue was recrystallized from acetone/hexane. There was obtained 407 mg 6α-fluoro-9,11β-dichloro-21-nitryloxy-16α-methyl-1,4-pregnadiene-3,20-dione with a melting point 198°–200°C. UV: $\epsilon_{236} = 16,700$.

EXAMPLE 16

A solution of 500 mg 6α-fluoro-21-hexanoyloxy-16α-methyl-1,4,9,(11)-pregnatriene-3,20-dione (melting point 119.5°–120°C) in 25 ml conc. acetic acid was reacted with 2.5 g lithium chloride, 500 mg N-bromosuccinimide and 1.0 ml HCl-saturated dioxane. The mixture was subjected to stirring at room temperature for 45 minutes and then poured into water. The precipitated product was removed by suction, washed with water and dried in vacuum. After recrystallization from methanol there were obtained 444 mg 6α-fluoro-11β-chloro-9-bromo-21-hexanoyloxy-16α-methyl-1,4-pregnadiene-3,20-dione with a melting point between 113° and 115°C. UV: $\epsilon_{239} = 15,200$.

EXAMPLE 17

3.0 g 6α-fluoro-9,11β-dichloro-21-hydroxy-16α-methyl-1,4-pregnadiene-3,20-dione were reacted with trimethylacetic acid anhydride in the manner described in Example 7. The crude product was then purified by chromatography through silica gel. By elution with 9.5–12 percent acetone/pentane there were obtained 980 mg 6α-fluoro-9α,11β-dichloro-21-trimethylacetoxy-16α-methyl-1,4-pregnadiene-3,20-dione with a melting point 189°–190°C (acetone/hexane). UV: $\epsilon_{237} = 14,700$.

EXAMPLE 18

8.5 ml anhydrous fluoric acid, 11.5 ml tetrahydrofuran and 16 ml methylene chloride were added together at −75°C. 4.0 g 6α-fluoro-21-hexanoyloxy-16α-methyl-1,4,9(11)-pregnatriene-3,20-dione and 8.0 g N-chlorosuccinimide were dissolved in this mixture and the product was then stirred for 3 hours at −50°C and thereafter was permitted to stand for another 16 hours at 0°C and was then finally poured into a solution of 45 g sodium bicarbonate in 1.5 liters water, was dried with sodium sulfate and subjected to evaporation of the solvent in vacuum. The residue was recrystallized from acetone/hexane. There were obtained 3.10 g 6α,11β-difluoro-9α-chloro-21-hexanoyloxy-16α-methyl-1,4-pregnadiene-3,20-dione with a melting point between 121-122°C (acetone/hexane). UV: $\epsilon_{236} = 15,500$.

EXAMPLE 19

A solution of 3.82 g 6α-fluoro-21-hexanoyloxy-16α-methyl-1,4,9(11)-pregnatriene-3,20-dione in 20 ml conc. acetic acid was reacted with 20 g lithium chloride, 3.82 g N-chlorosuccinimide and 3.82 ml HCl-saturated dioxane. The solution was stirred for 1 hour and poured into water, whereupon the precipitated product was removed by suction, washed with water, and dried. The crude product was subjected to chromatography through silica gel. Elution with 10.5–11.5 percent acetone/pentane yielded 1.61 g 6α-fluoro-9α,11β-dichloro-21-hexanoyloxy-16α-methyl-1,4-pregnadiene-3,20-dione, melting point 124°–126.7°C (acetone/hexane). UV: $\epsilon_{236} = 15,600$.

EXAMPLE 20

2.0 g 6α-fluoro-9,11β-dichloro-21-hydroxy-16α-methyl-1,4-pregnadiene-3,20-dione were reacted in the manner described in Example 5. The crude product was subjected to chromatography through silica gel. Elution with 10–16 percent acetone/pentane yielded 1.06 g 6α-fluoro-9α,11β-dichloro-21-butyryloxy-16α-methyl-1,4-pregnadiene-3,20-dione with a melting point between 203° and 203.5°C (acetone/hexane). UV: $\epsilon_{237} = 16,000$.

EXAMPLE 21

A solution of 3.3 g 6α-fluoro-9,11β-dichloro-21-hydroxy-16α-methyl-1,4-pregnadiene-3,20-dione in 13.2 ml pyridine and 6.6 ml valeric acid anhydride was stirred at room temperature for 16 hours. The pyridine and the excess valeric acid anhydride were subsequently distilled off with steam. The residue from the distillation was extracted with methylene chloride. The extract was then washed wit sodium bicarbonate and water, dried with sodium sulfate, and concentrated in vacuum. The residue was subjected to chromatography through silica gel. Elution with 10–13 percent acetone/pentane yielded 2.2 g 6α-fluoro-9α,11β-dichloro-21-valeryloxy-16α-methyl-1,4-pregnadiene-3,20-dione with a melting point between 122° and 123°C (acetone/hexane). UV: $\epsilon_{237} = 14,800$.

EXAMPLE 22

5.0 g 6α,11β-difluoror-9-chloro-21-hydroxy-16α-methyl-1,4-pregnadiene-3,20-dione were reacted with valeric acid anhydride in the manner described in Example 21. The isolated crude product was twice recrystallized from acetone/hexane. There were obtained 4.40 g 6α,11β-difluoro-9α-chloro-21-valeryloxy-16α-methyl-1,4-pregnadiene-3,20-dione with a melting point between 142° and 143°C. UV: $\epsilon_{235} = 15,800$.

EXAMPLE 23

A solution of 100 mg 6α-fluoro-9α,11β-dichloro-21--hydroxy-16α-methyl-1,4-pregnadiene-3,20-dione in 2.0 ml pyridine was reacted with 400 mg succinic acid anhydride, subjected to stirring for 24 hours at room temperature and then poured into water and extracted with ether. The ether phase was washed with 4 N sulfuric acid and water, dried, and concentrated in vacuum. The residue was subjected to trituration with hexane, followed by isolation of the crystalline compound. There were obtained 73 mg 6α-fluoro-9α,11β-dichloro-3,20-dioxo-16α-methyl-1,4-pregnadiene-21-yl-hydrogen succinate with a melting point of 176°–179°C. UV: $\epsilon_{235} = 15,900$.

EXAMPLE 24

A solution of 600 mg 6α,11β-difluoro-9-chloro-21--hydroxy-16α-methyl-1,4-pregnadiene-3,20-dione in 18 ml conc. formic and and 5 ml tetrahydrofuran was reacted with 120 mg p-toluenesulfonic acid and was permitted to stand for one hour at room temperature. The reaction mixture was stirred into water and the precipitated product was removed by suction, washed, and taken up with methylene chloride. The solution was dried over sodium sulfate and concentrated in vacuum. The residue was subjected to chromatography. After recrystallization from acetone/hexane, 200 mg 6α,11β-difluoro-9-chloro-21-formyloxy-16α-methyl-1,4-pregnadiene-3,20-dione were obtained having a melting point between 220° and 223°C. UV: $\epsilon_{235} = 16,700$.

EXAMPLE 25

0.45 ml of sulfuric trioxide was added dropwise at −15°C to 7.5 ml anhydrous pyridine. The mixture was reacted at 0°C with 3.7 g 6α,11β-difluoro-9-chloro-21-hydroxy-16α-methyl-1,4-pregnadiene-3,20-dione and subsequently stirred for 1 hour at 20°C. The reaction solution was diluted with 80 ml water, was brought up to a pH of 8.6 with sodium hydroxide and was extracted repeatedly with methylene chloride. The aqueous phase was concentrated in vacuum at 40°C and the residue was digested with methanol. The undissolved material was removed by filtration. The methanol was then distilled off in vacuum and the residue was dried over phosphorus pentoxide. There were obtained 4.6 g of sodium-(6α,11β-difluoro-9-chloro-3.20-dioxo-16α-methyl-1,4-pregnadiene-21-yl)-sulfate, which dissociated above 160°C upon sintering. UV: $\epsilon_{237} = 15,700$.

EXAMPLE 26

1.0 g 6α-fluoro-9,11β-dichloro-21-hydroxy-16α-methyl-1,4-pregnadiene-3,20-dione were reacted in the manner described in Example 25 with sulfur trioxide/pyridine and subsequently with sodium hydroxide. There were obtained 1.2 g sodium-(6α-fluoro-9,11β-dichloro-3,20-dioxo-16α-methyl-1,4-pregnadiene-21-yl)-sulfate, which disintegrated above 150°C upon sintering. UV: $\epsilon_{238} = 15,900$.

The following examples illustrate pharmaceutical compositions incorporating effective amounts of the compounds of the invention. The pharmaceutical compositions may be in the form of ointments, tablets, eye-drops, nose-drops or ear-drops, as desired. They can also be prepared in the form of solutions suited for injection. Preferably, the pharmaceutical compositions should contain the following amounts of the compounds of the invention:

1. ointments: 0.0001 up to 0.1 percent active ingredient
2. tablets: 0.01 to 50 mg per tablet
3. eye-, nose- and ear-drops: 0.01 to 1 percent active ingredient.
4. solutions for injection: 0.1 to 1 percent active ingredient.

Preferably, the composition is applied in a dose of about 1 to 100 mg in the case of an ointment, about 1 to 10 tablets, about 1 to 20 drops, and 0.1 to 3 ml solution.

EXAMPLE 27

Composition for an ointment:
0.01 g 6α,11β-difluoro-9-chloro-21-trimethylacetoxy-16α-methyl-1,4-pregnadiene-3,20-dione
5.00 g white wax DAB 6 (Deutsches Arzneibuch 6)
5.00 g wool, fat, anhydrous, DAB 6
20.00 g vaseline, white DAB 6
25.00 g Amphocerin K "Dehydag"
14.97 g paraffin oil, liquid DAB 6
30.00 g water, desalted
0.02 g Crematest Perfume Oil No. 6580 "Dragee"

EXAMPLE 28

Composition for an ointment:
0.01% 6α,11β-difluoro-9-chloro-21-hydroxy-16α-methyl-1,4-pregnadiene-3,20-dione
0.01% 6α,11β-difluoro-9-chloro-21-butyryloxy-16α-methyl-1,4-pregnadiene-3,20-dione
2.50% Allercurhexachlorophenate, micronized to a particle size of about 8 μ (Allercur registered trade mark for 1-p-chlorobenzyl-2-pyrrolidyl-methyl-benzimidazole)
6.00% Hostaphat KW 340 (tert. ester of phosphoric acid and paraffin alcohol tetraglycolether)
0.10% sorbic acid
10.00% neutral oil ("Migloyol 812")
3.50% stearyl alcohol
1.50% wool fat, anhydrous, DAB 6
75.90% desalted water

EXAMPLE 29

Composition for a tablet:
0.250 mg 6α-fluoro-9,11β-dichloro-21-trimethylacetoxy-16α-methyl-1,4-pregnadiene-3,20-dione
36.000 mg lactose DAB 6

75,780 mg cornstarch USP XVI
0.500 mg sodiumlaurylsulfate ("Texapon K 12") "Dehydag," USP XVI
1.400 mg gelatin, white DAB 6
6.000 mg talcum DAB 6
0.024 mg "Nipagin M" (p-oxybenzoic acid methyl ester) DAB 6, 3. (Deutsches Arzneibuch 6, 3rd Supplement)
0.011 mg "Nipasol M" (p-oxygenzoic acid propyl ester) DAB 6, 3rd Supplement
0.035 mg pigment Pistachio Green "Dragoco"

EXAMPLE 30

Composition for a tablet:
0.025 mg 6α-fluoro-9,11β-dichloro-21-acetoxy-16α-methyl-1,4-pregnadiene-3,20-dione
36.475 mg lactose DAB 6
75.530 mg cornstarch USP XVI
0.500 mg sodiumlaurylsulfate ("Texapon K 12") "Dehydag" USP XVI
1.400 mg gelatin, white, DAB 6
6.000 mg talcum DAB 6
0.024 mg "Nipagin M" (p-oxybenzoic acid methyl ester) DAB 6, 3rd Supplement
0.011 mg "Nipasol M" (p-oxybenzoic acid propyl ester) DAB 6, 3rd Supplement
0.035 mg pigment Pistachio Green "Dragoco"

EXAMPLE 31

Composition for a tablet:
0.050 mg 6α,11β-difluoro-9-chloro-21-acetoxy-16α-methyl-1,4-pregnadiene-3,20-dione
76.515 mg cornstarch USP XVI
36.000 mg lactose, DAB 6
6.000 mg talcum, DAB 6
1.400 mg gelatin, white DAB 6
0.024 mg "Nipagin M" (p-oxybenzoic acid methyl ester) DAB 6, 3rd Supplement
0.011 mg "Nipasol M" (p-oxybenzoic acid propyl ester) DAB, 3rd Supplement As is customary, the tablets were produced on a tablet press.

EXAMPLE 32

Preparation of Ear-Drops:
100 mg 6α,11β-difluoro-9-chloro-21-hexanoyloxy-16α-methyl-1,4-pregnadiene-3,20-dione were dissolved in 100 ml 1,2-propylene glycol/ethyl alcohol (9:1).

EXAMPLE 33

Preparation of Eye-Drops (Oily):
100 mg 6α-fluoro-9,11β-dischloro-21-valeryloxy-16α-methyl-1,4-pregnadiene-3,20-dione were dissolved in 100 ml castor oil. After addition of 200 mg Chloramphenicol (or another bacteriostatic agent) thereto, the solution was sterilized by filtration and aseptically drawn off.

EXAMPLE 34

Preparation of Eye-Drops (Aqueous):
100 mg sodium-(6α,11β-difluoro-9-chloro-3,20-dioxo-16α-methyl-1,4-pregnadiene-21-yl)-sulfate were dissolved in 100 ml distilled water and after addition thereto of 5 g sulfaethylthiodiazole the solution was sterilized by filtration and drawn off aseptically.

EXAMPLE 35

Preparation of Nose-Drops (Aqueous):
100 mg sodium-(6α-fluoro-9,11β-dichloro-3,20-dioxo-16α)-methyl-1,4-pregnadiene-21-yl)-sulfate and 2 g Chloramphenicol were dissolved in 100 ml distilled water.

EXAMPLE 36

Preparation of a Solution for Injection Purposes:
50 mg 6α,11β-difluoro-9-chloro-21-valeryloxy-16α-methyl-1,4-pregnadiene-3,20-dione were dissolved in 10 ml sesame oil and the solution was poured into 1 ml ampoules and sterilized in the customary manner.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A pharmaceutical composition containing a pharmaceutically acceptable carrier and as active ingredient an 11-halogen substituted steroid of the formula

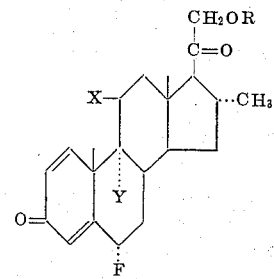

wherein R is hydrogen, aliphatic acyl of up to 15 carbon atoms or aliphatic acyl having up to a total of 15 carbon atoms and being substituted with chlorine, or a carboxylic acid group, a nitryl group or a sulphate group and wherein X and Y are halogen, the molecular weight of Y being at least equal to that of X.

2. The pharmaceutical composition of claim 1, which is in the form of an ointment and contains about 0.0001 to 0.1 percent active ingredient.

3. The pharmaceutical composition of claim 1, which is in the form of tablets, each tablet containing about 0.01 to 50 mg active ingredient.

4. The pharmaceutical composition of claim 1, which is in the form of drops for eye, nose or ear applications and containing about 0.01 to 1.0 percent active ingredient.

5. The pharmaceutical composition of claim 1, which is in the form of a solution for injection containing about 0.1 to 10 percent active ingredient.

6. The composition of claim 1 in which the active ingredient is 6α,11β-difluoro-9-chloro-21-formyloxy-16α-methyl-1,4-pregnadiene-3,20-dione.

7. The composition of claim 1 in which the active ingredient is 6α,11β-difluoro-9-bromo-21-acetoxy-16α-methyl-1,4-pregnadiene-3,20-dione.

8. The composition of claim 1 in which the active ingredient is 6α,11β-difluoro-9-chloro-21-acetoxy-16α-methyl-1,4-pregnadiene-3,20-dione.

9. The composition of claim 1 in which the active ingredient is 6α,11β-difluoro-9-bromo-21-hydroxy-16α-methyl-1,4-pregnadiene-3,20-dione.

10. The composition of claim 1 in which the active ingredient is 6α,11β-difluoro-9-chloro-21-hydroxy-16α-methyl-1,4-pregnadiene-3,20-dione.

11. The composition of claim 1 in which the active ingredient is 6α,11β-difluoro-9-bromo-21-butyryloxy-16α-methyl-1,4-pregnadiene-3,20-dione.

12. The composition of claim 1 in which the active ingredient is 6α,11β-difluoro-9-chloro-21-butyryloxy-16α-methyl-1,4-pregnadiene-3,20-dione.

13. The composition of claim 1 in which the active ingredient is 6α,11β-difluoro-9-bromo-21-trimethylacetoxy-16α-methyl-1,4-pregnadiene-3,20-dione.

14. The composition of claim 1 in which the active ingredient is 6α,11β-difluoro-9-chloro-21-trimethylacetoxy-16α-methyl-1,4-pregnadiene-3,20-dione.

15. The composition of claim 1 in which the active ingredient is 6α-fluoro-9,11β-dichloro-21-acetoxy-16α-methyl-1,4-pregnadiene-3,20-dione.

16. The composition of claim 1 in which the active ingredient is 6α-fluoro-11β-chloro-9-bromo-21-acetoxy-16α-methyl-1,4-pregnadiene-3,20-dione.

17. The composition of claim 1 in which the active ingredient is 6α-fluoro-11β-chloro-9-bromo-21-hydroxy-16α-methyl-1,4-pregnadiene-3,20-dione.

18. The composition of claim 1 in which the active ingredient is 6α-fluoro-11β-chloro-9-bromo-21-chloroacetoxy-16α-methyl-1,4-pregnadiene-3,20-dione.

19. The composition of claim 1 in which the active ingredient is 6α-fluoro-9,11β-dichloro-21-hydroxy-16α-methyl-1,4-pregnadiene-3,20-dione.

20. The composition of claim 1 in which the active ingredient is 6α-fluoro-11β-chloro-9-bromo-21-hexanoyloxy-16α-methyl-1,4-pregnadiene-3,20-dione.

21. The composition of claim 1 in which the active ingredient is 6α-fluoro-9,11β-dichloro-21-nitryloxy-16α-methyl-1,4-pregnadiene-3,20-dione.

22. The composition of claim 1 in which the active ingredient is 6α-fluoro-9,11β-dichloro-21-trimethylacetoxy-16α-methyl-1,4-pregnadiene-3,20-dione.

23. The composition of claim 1 in which the active ingredient is 6α,11β-difluoro-9-chloro-21-hexanoyloxy-16α-methyl-1,4-pregnadiene-3,20-dione.

24. The composition of claim 1 in which the active ingredient is 6α-fluoro-9,11β-dichloro-21-hexanoyloxy-16α-methyl-1,4-pregnadiene-3,20-dione.

25. The composition of claim 1 in which the active ingredient is 6α-fluoro-9,11β-dichloro-21-butyryloxy-16α-methyl-1,4-pregnadiene-3,20-dione.

26. The composition of claim 1 in which the active ingredient is 6α-fluoro-9,11β-dichloro-21-valeryloxy-16α-methyl-1,4-pregnadiene-3,20-dione.

27. The composition of claim 1 in which the active ingredient is 6α,11β-difluoro-9-chloro-21-valeryloxy-16α-methyl-1,4-pregnadiene-3,20-dione.

28. The composition of claim 1 in which the active ingredient is 6α-fluoro-9α,11β-dichloro-3,20-dioxo-16α-methyl-1,4-pregnadiene-21-yl-hydrogen succinate.

29. The composition of claim 1 in which the active ingredient is sodium-(6α,11β-difluoro-9-chloro-3,20-dioxo-16α-methyl-1,4-pregnadiene-21-yl)-sulfate.

30. The composition of claim 1 in which the active ingredient is sodium-(6α-fluoro-9,11β-dichloro-3,20-dioxo-16α-methyl-1,4-pregnadiene-21-yl)-sulfate.

31. The method of treating patients suffering from inflammations comprising administering to the patient, by injection or by enteral or topical administration, a pharmaceutical compositions containing an effective amount of a 11-halogen-steroid as defined in claim 1 and a pharmaceutically acceptable carrier therefor.

* * * * *